(12) United States Patent
Naaktgeboren

(10) Patent No.: US 7,942,599 B2
(45) Date of Patent: May 17, 2011

(54) COUPLING MECHANISM

(75) Inventor: Adrianus Naaktgeboren, Varsenare (BE)

(73) Assignee: CNH America LLC, New Holland, PA (US)

(*) Notice: Subject to any disclaimer, the term of this patent is extended or adjusted under 35 U.S.C. 154(b) by 647 days.

(21) Appl. No.: 11/799,543

(22) Filed: May 2, 2007

(65) Prior Publication Data
US 2008/0015033 A1    Jan. 17, 2008

(30) Foreign Application Priority Data
May 9, 2006   (GB) .................................. 0609039.3

(51) Int. Cl.
A01D 69/08   (2006.01)
A01D 39/00   (2006.01)
(52) U.S. Cl. ................. 403/2; 56/10.3; 56/11.2; 464/33
(58) Field of Classification Search ........ 403/2; 464/33; 56/10.3, 11.2, 11.4
See application file for complete search history.

(56) References Cited

U.S. PATENT DOCUMENTS

| 2,641,116 | A | * | 6/1953 | Russell | 464/33 |
|---|---|---|---|---|---|
| 2,665,570 | A | * | 1/1954 | Ream | 464/33 |
| 2,746,584 | A | * | 5/1956 | Skromme | 192/28 |
| 4,190,209 | A | * | 2/1980 | deBuhr et al. | 241/101.762 |
| 4,220,019 | A | * | 9/1980 | Mast et al. | 198/624 |
| 4,253,472 | A | * | 3/1981 | Rayfield | 460/109 |
| 4,318,284 | A | * | 3/1982 | van der Lely et al. | 464/33 |
| 4,434,607 | A | * | 3/1984 | Campbell | 56/341 |
| 4,509,315 | A | * | 4/1985 | Giguere | 56/10.7 |
| 4,758,109 | A | * | 7/1988 | Little et al. | 403/2 |
| 5,090,307 | A | * | 2/1992 | Lippens et al. | 100/35 |
| 5,310,021 | A | * | 5/1994 | Hightower | 185/40 R |
| 5,651,629 | A | * | 7/1997 | Wall et al. | 403/2 |
| 5,807,179 | A | * | 9/1998 | Hansen et al. | 464/33 |
| 5,906,029 | A | * | 5/1999 | Fox | 16/386 |
| 6,393,813 | B1 | * | 5/2002 | Nowak | 56/10.2 J |
| 6,644,005 | B1 | * | 11/2003 | Grahl et al. | 56/341 |
| 6,691,844 | B2 | * | 2/2004 | Schott | 192/22 |
| 6,925,788 | B2 | * | 8/2005 | Nelson et al. | 56/11.2 |
| 2004/0159087 | A1 | | 8/2004 | Nelson et al. | |
| 2005/0202882 | A1 | | 9/2005 | Schott et al. | |

FOREIGN PATENT DOCUMENTS

| GB | 946047 A | 1/1964 |
|---|---|---|
| GB | 978027 | 7/1967 |
| GB | 1379808 A | 1/1975 |

* cited by examiner

Primary Examiner — Joshua T Kennedy
(74) Attorney, Agent, or Firm — Patrick M. Sheldrake; Michael G. Harms

(57) ABSTRACT

An agricultural harvesting machine comprises a coupling for connecting a shaft to a driving element mounted for rotation about the shaft. The coupling provides a torque path between the shaft and the driving element which passes through both a lost motion connection and a shear bolt.

15 Claims, 5 Drawing Sheets

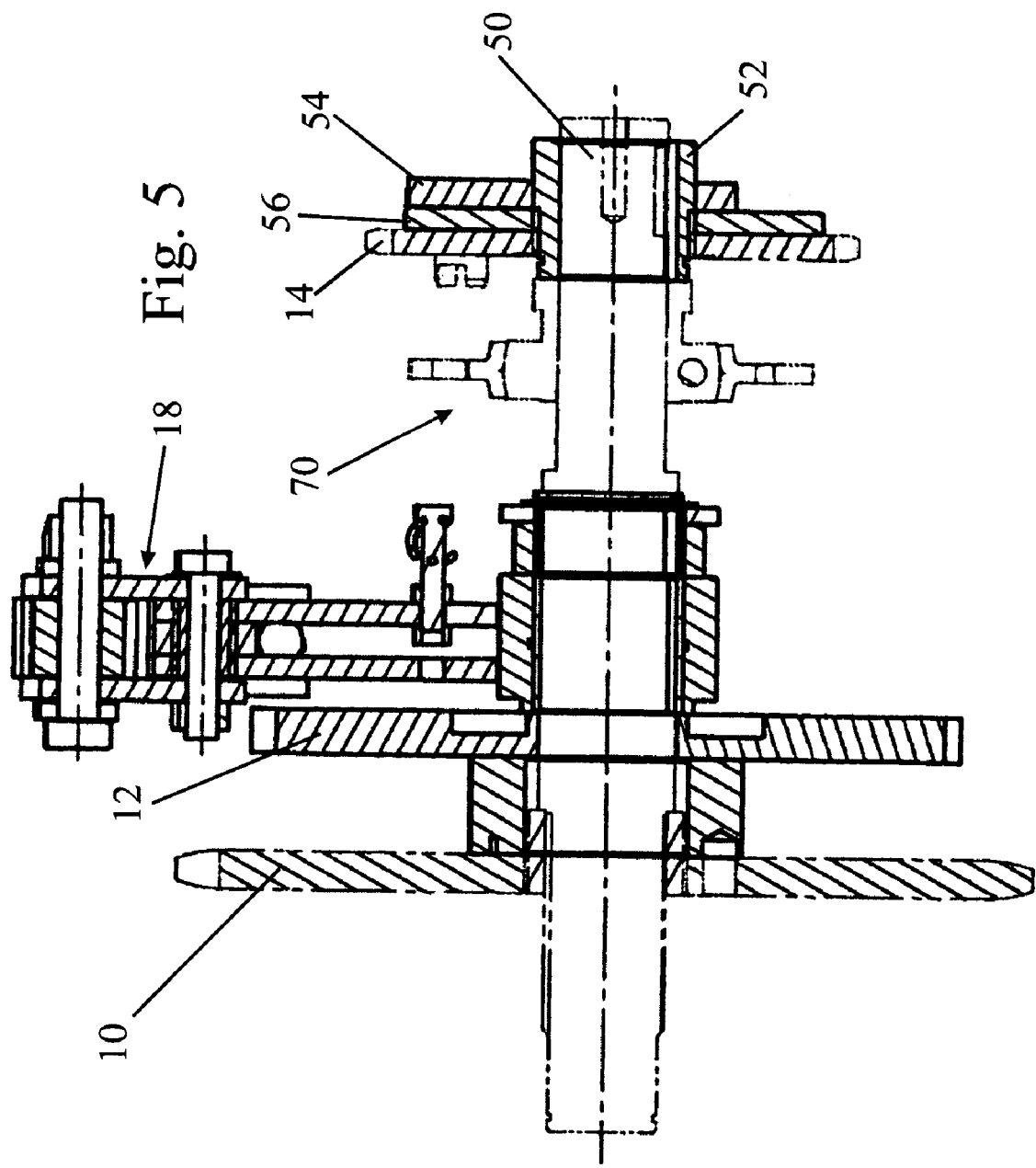

COUPLING MECHANISM

FIELD OF THE INVENTION

The present invention relates to a coupling mechanism for a pickup system of an agricultural harvesting machine, and can be used with round and square balers or any other harvester having a rotor type in-feed system.

BACKGROUND OF THE INVENTION

In a baler, straw, hay or other crop material is picked up from the ground by a pickup system and supplied to a feeder system, e.g., a rotor, which propels the straw into the baling chamber, where it is compacted and formed into bales. The pickup system and the feeder may alternatively be part of an in-feed or transport element for other crop processing means. The feeder and pickup system are connected to rotate in the forward direction at the same time as one another. Typically, a shaft of the rotor which is driven by way of first sprocket by, for example, a tractor PTO (power take-off) shaft, carries a second sprocket which is connected to drive the pickup system. The present invention is particularly concerned with the construction of the coupling mechanism that is suitable for coupling the rotor to the second sprocket driving the pickup system.

A requirement of the coupling between the feeder drive and the pickup system is that it must be disengaged automatically in the event of an obstruction in the pickup system.

A coupling is known which comprises discs rotatable with the rotor shaft and disposed adjacent the pickup system drive sprocket. The disc and the sprocket are connected to one another by a shear bolt inserted through bushings affixed to the disc and sprocket. The bolt shears when the torque transmitted through the coupling exceeds a preset maximum and thereby automatically disengages the drive to the pickup system when a serious obstruction is encountered.

A problem that is experienced with this form of coupling is that after the bolt has sheared it is necessary to realign the bushings in which it fits before it can be replaced by a new shear bolt. As the disc rotates with the feeder and the other with the pickup system, one of these two has to be rotated to achieve the required accurate alignment of the holes and having regard to the size and mass of these two items, this is a task that requires the use of large wrenches or levers. Such means are not readily available when operating the baler in the field.

OBJECT OF THE INVENTION

The present invention seeks therefore to provide a coupling that incorporates a shear bolt which disengages the coupling automatically when a maximum torque is exceeded yet which permits a sheared bolt to be replaced simply by a new one.

SUMMARY OF THE INVENTION

According to the present invention, there is provided an agricultural harvesting machine comprising a coupling for connecting a shaft to a driving element mounted for rotation about the shaft, wherein the coupling provides a torque path between the shaft and the driving element which passes through both a lost motion connection and a shear bolt.

A lost motion connection is one that transmits force or torque in opposite directions but provides free play when the direction of the force or torque is reversed before a driving connection is re-established.

Because of the provision of such lost motion within the coupling of the present invention, after the bolt has sheared, there is no requirement to reposition the shaft or the driving element to allow the shear bolt to be replaced. Instead, the lost motion allows a wide range of relative phases between the shaft and the driving element within which the shear bolt can be replaced.

In a baler, in order to remove blockages that may develop from irregular crop feed, the feeder rotor is commonly provided with a reversing mechanism. Clearing a blockage may require the rotor to be turned in the opposite sense but the pickup system could be damaged if rotated in the wrong sense. The lost motion connection in a coupling of the present invention also mitigates this problem by acting as a limited overrun clutch allowing the rotor to be reversed without any corresponding movement of the pickup system until the lost motion in the coupling is fully taken up in the reverse direction, thereby avoiding damage to the tines of the pickup system.

In a preferred embodiment of the invention, the coupling further comprises a disc that is rotatable relative to the shaft and connected to the driving element by means of the shear bolt, the lost motion connection being arranged between the shaft and the disc.

The lost motion connection may conveniently be achieved by means of engagement between a radial arm that is fast in rotation with the shaft and an abutment projecting axially from the side of the disc facing away from the driving element. Such a connection allows a range of free play which approaches one complete revolution.

BRIEF OF THE DRAWINGS

The invention will now be described further, by way of example, with reference to the accompanying drawings, in which:

FIG. 4 is a section through a detail of the reversing mechanism of FIG. 1.

FIG. 5 is a section taken along the line V-V in FIG. 3.

DETAILED DESCRIPTION OF THE PREFERRED EMBODIMENT

Figure 1:
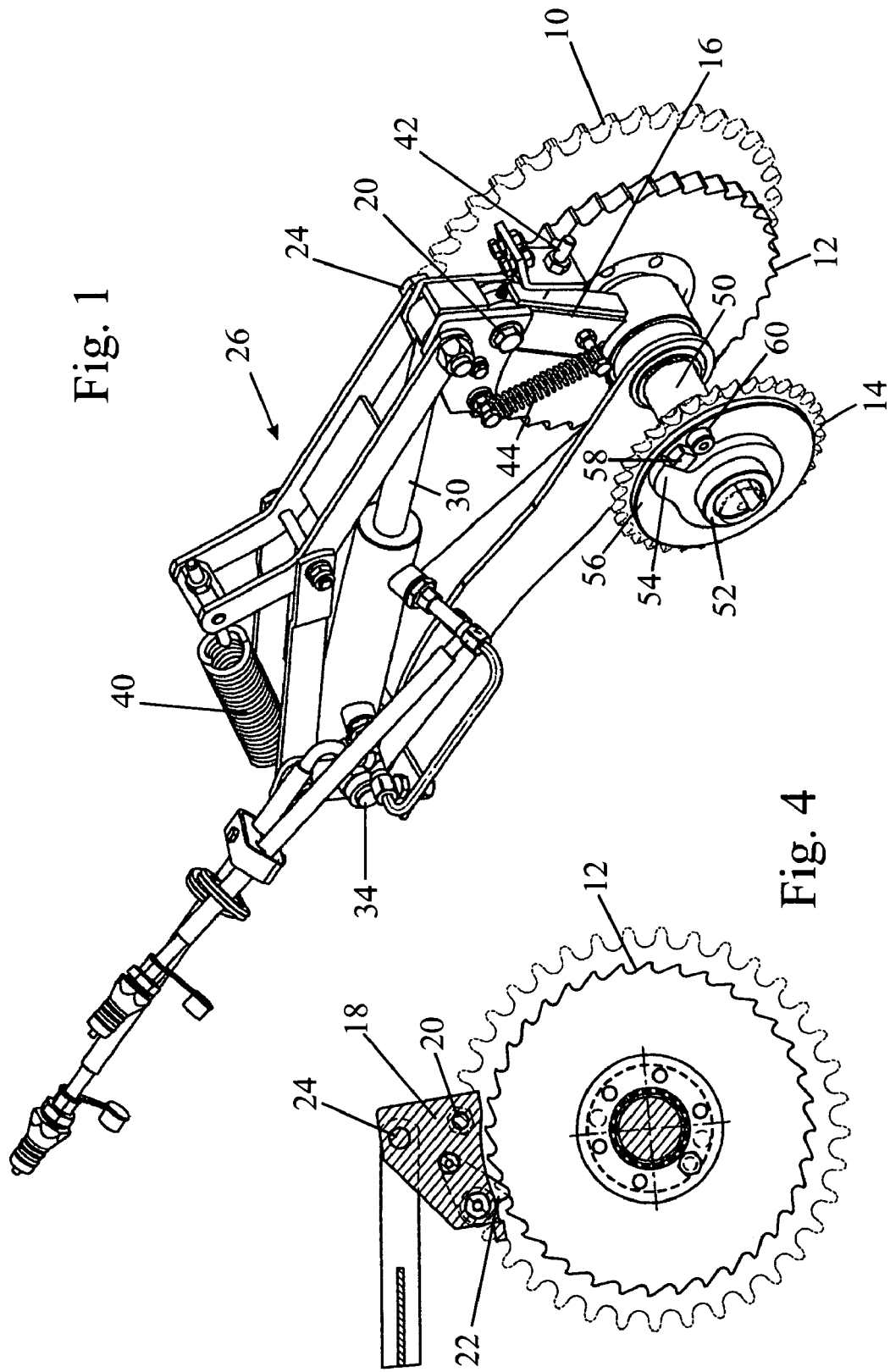
FIG. 1 is a perspective view of a reversing mechanism of a baler.

In the drawings, the sprocket 10 is used to drive the rotor of a baler, the rotor not being shown in the drawings. A ratchet 12 is mounted on the same axis for rotation with the rotor as is a second sprocket 14 which is used to transmit drive to a pickup system. As earlier explained, blockages develop from time to time within the baler and these are freed by rotating the rotor in the reverse direction.

The reversing mechanism comprises a reversing arm 16 rotatable about the axis of the rotor and carrying a head 18 which is shown in section in FIG. 4. The head 18 can pivot relative to the reversing arm 16 about a pivot bolt 20 and it carries a pawl 22 which engages the teeth of the ratchet 12. At a point 24 above the pivot 20, the head 18 is pivotably connected to the end of the rod 30 of a double acting hydraulic jack 32 of which the cylinder is pivotably mounted about a fixed pivot bolt 34.

Figure 2:
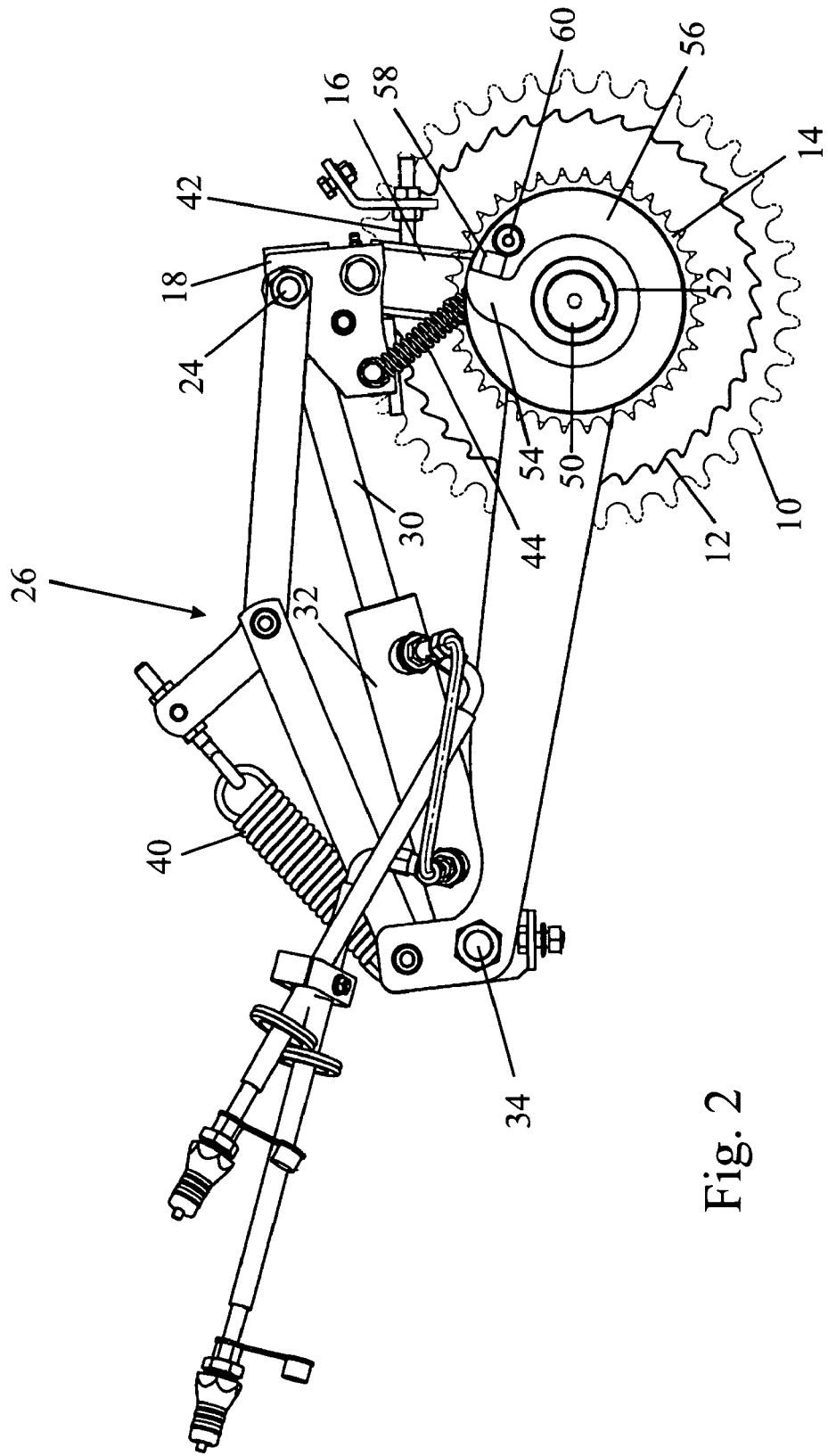
FIG. 2 is a side view of the mechanism shown in FIG. 1.

When the rotor is to be reversed for the purpose of clearing a blockage, the rod 30 of the hydraulic jack 32 is retracted from the park position shown in FIG. 2. Pulling on the pivot point 24 causes the head 18 to pivot about the bolt 20 so that the pawl 22 engages in the teeth of the ratchet 12. This locks the reversing arm 16 to the rotor and as the rod 30 is retracted the rotor is caused to rotate in the reverse direction. To continue to turn the rotor after the rod of 30 has reached the limits of its stroke, the rod 30 is first extended towards the illustrated position in FIG. 2. While doing so, the pawl 22 will ride over the teeth of the ratchet 12 against the action of a spring 44 which biases the pawl 22 in a direction to engage with the ratchet teeth. Several cycles of operation of the hydraulic jack 32 may be carried out until the rotor has been turned sufficiently for the blockage to be cleared.

Once the blockage has been cleared, it is essential for the pawl 22 to be disengaged from the teeth of the ratchet 12 before the drive to the rotor through the sprocket 10 is re-engaged. This is effected by extending the rod 30 to the position shown in FIG. 2 in which the reversing arm 16 abuts an adjustable stop 42. Further extension of the rod 30 will now cause the head 18 to pivot clockwise, as viewed, about the bolt 20 and thereby disengage the pawl 22 from the teeth of the ratchet 12. This is the position which is referred to herein as the park position.

To ensure that the head 18 of the reversing arm 16 always returns to the parking position, it is additionally pivotably connected at the point 24 to a lever system 26 biased by a spring 40 which together urge the reversing arm 16 towards the park position. The construction and operation of the lever system and necessary modifications to the circuit of the hydraulic jack 32 are described in detail in GB Patent Application No. 0607557.6 but such a detailed explanation is not required in the present context. It suffices for an understanding of the present invention to know that the rotor shaft 50 which is coupled to the sprocket 14 driving the pickup system normally turns continuously in one direction but it occasionally needs to be turned a small amount in the opposite direction to free a blockage.

The mechanism coupling the shaft 50 to the sprocket 14 comprises a collar 52 that is keyed onto the shaft 50 and has a radially projecting arm 54. A disc 56 freely mounted for rotation about the collar 52 has an abutment block 58 that projects into the path of the radial arm 54 from the side of the disc 56 facing away from the sprocket 14. The sprocket 14 which serves to drive the pickup system is also freely rotatable about the collar 52 and is coupled for rotation with the disc 56 by means of a shear bolt (not shown). The bolt is passed through two hardened bushings 60 and 62 that are welded to the disc 56 and the sprocket 14, respectively. The head of the bolt rests on the bushing 60 and its nut is received in, and prevented from rotating by, the bushing 62 (see FIG. 5) that is welded to the sprocket 14.

Figure 3:
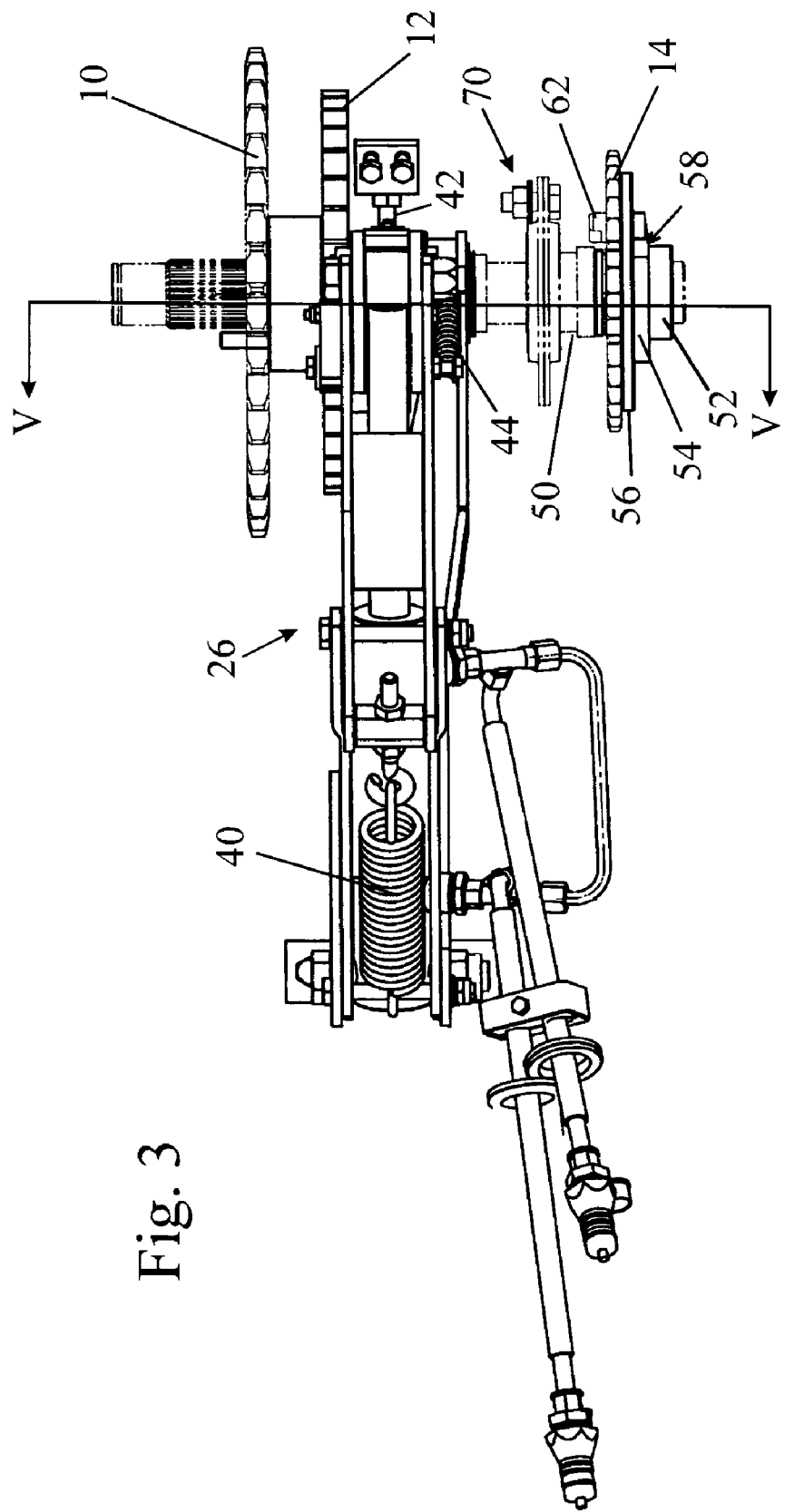
FIG. 3 is a plan view from above of the mechanism shown in FIG. 1.

FIGS. 3 and 5 also show a bearing support for the shaft 50 which is generally designated 70. This is one of the bearings used to support the rotor shaft 50 in the frame of the agricultural machine but it is drawn in dotted lines and will not be described herein in detail as it is not concerned with the operation of the coupling driving the pickup system.

Figure 6:
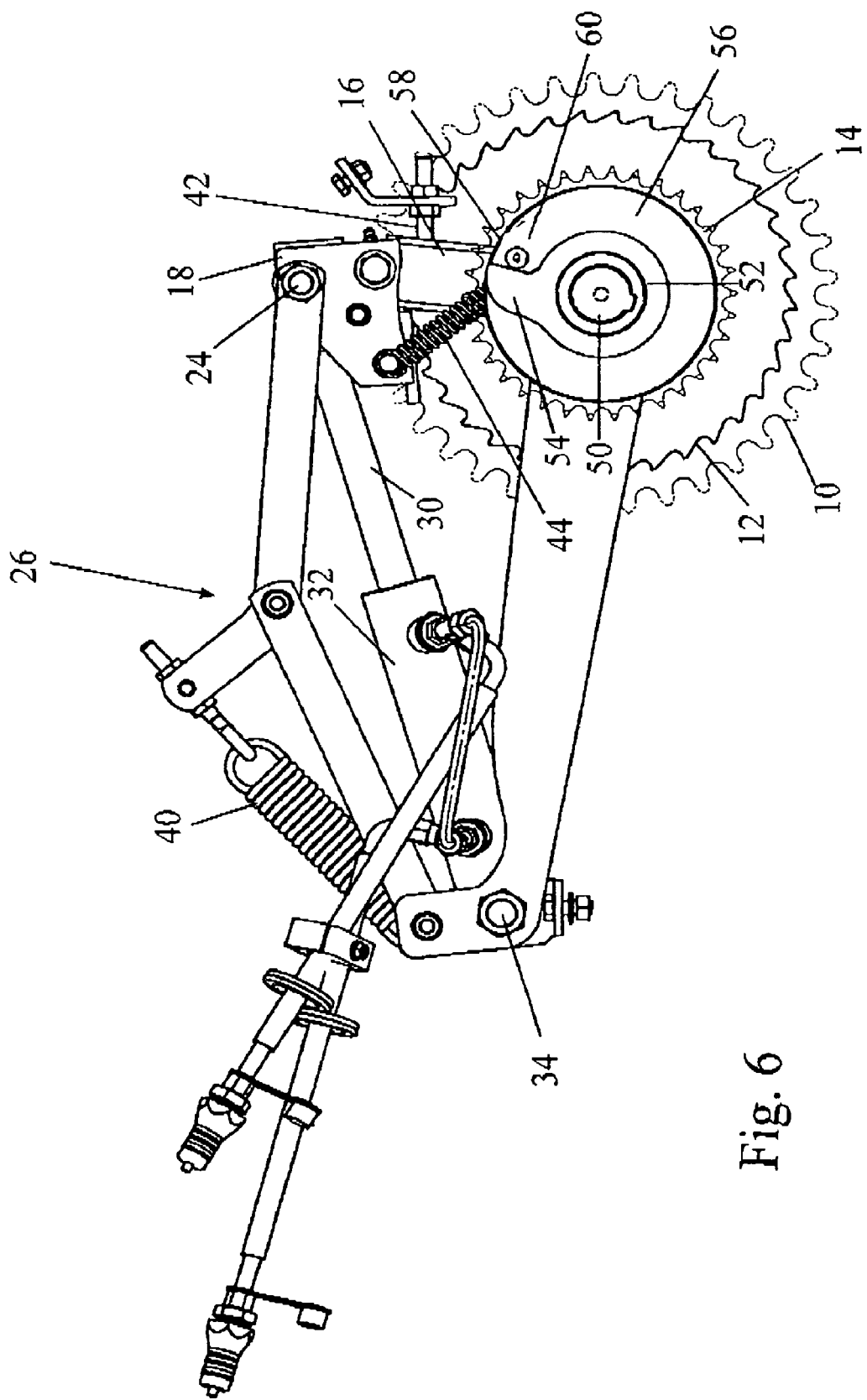
FIG. 6 is a side view of a second embodiment of the invention.

Under normal operating, because of the keying of the collar 52 to the rotor shaft 50, rotation of the rotor shaft 50 rotates the arm 54 clockwise as viewed in FIG. 2 until it comes into contact with the abutment block 58. Once abutment occurs, the disc 56 is made to rotate with the shaft 50 and this then drives the sprocket 14 through the shear bolt causing the pickup system to operate. Of course, such an abutment block 58 would be superfluous if the bushing 60 were made sufficiently strong to fulfill fulfil the same task as shown in FIG. 6.

Should a blockage occur, it is freed by rotating the shaft 50 counter clockwise using the previously described reversing mechanism. Rotation of the arm 54 counter clockwise causes it to move away from the abutment 58 so that no torque is transmitted to the pickup system for nearly one complete revolution, after which it will come into contact with the bushing 60. This amount of lost motion, which is preferably at least half a turn and more preferably three quarters of a turn, is normally sufficient to allow the rotor blockage to be cleared.

If, for any reason, excessive resistance is encountered when driving the pickup system the shear bolt will shear automatically to disconnect the sprocket 14 from the shaft 50. After the obstruction in the pickup system has been cleared, a new shear bolt has to be inserted in the bushings 60 and 62 to reconnect the sprocket 14 for rotation with the rotor shaft.

Before a shear bolt can be replaced it is necessary first to align accurately the bushings in which it is to be inserted. In the prior art, when a shear bolt was used, it was mounted in elements that were fast in rotation with the rotor shaft 50 and the sprocket 14, respectively. Because of the large rotating masses in both the rotor and the pickup system, such realignment was very difficult to achieve, especially when working in the field.

This problem is circumvented in the illustrated embodiment of the invention in that the disc 56 can be rotated freely through nearly one complete revolution relative to the shaft 50. It is only necessary to rotate the rotor shaft 50, using either the power take off or the reversing mechanism, to a position in which the arm does not obstruct the position in which the bushings 60 and 62 are aligned. The disc 56 can then be rotated manually to align the bushings 60 and 62. Remounting of the shear bolt is simplified by the fact that its nut cannot turn in the bushing 62, so that it can be replaced simply using a single spanner to engage the head of the bolt, which remains readily accessible. The task of replacement of a shear bolt is thereby simplified to the extent that it can be carried out quickly in the field by an unassisted operator.

The invention claimed is:

1. An agricultural harvesting machine comprising:
   a crop pickup system having a driving element;
   a shaft;
   a feeder system having rotor having a driving element, the driving element of the rotor mounted to the shaft for rotation therewith; and
   a lost motion coupling comprising:
      a driving member mounted to the shaft for rotation therewith, and
      a disc being freely rotatably mounted to the shaft and connected to the driving element of the pickup by a shear member, the disc further having a driven member configured for receiving a force from the driving member mounted to the shaft,
   the lost motion coupling forming a torque path between the driving member mounted to the shaft and the driving element of the pickup through the disc and shear member, for rotating the pickup in a first direction corresponding to motion of the rotor;
   wherein the lost motion coupling is configured to permit reversal of rotation of the shaft and connected driving element of the rotor without corresponding movement of the pickup system and driving element thereof.

2. An agricultural machine as claimed in claim 1, wherein the driving member is a radial arm and the driven member is an abutment projecting axially from a side of the disc when the shaft rotated in a forward driving direction of the rotor and the pickup.

3. An agricultural machine as claimed in claim 2, wherein the abutment projects from the side of the disc facing away from the driving element.

4. An agricultural machine as claimed in claim 3, wherein the radial arm is rotatable in an opposite direction away from the abutment corresponding to rotation of the rotor in the reversed direction over at least half of a complete revolution.

5. An agricultural machine as claimed in claim 3, wherein the radial arm is rotatable in an opposite direction away from the abutment corresponding to rotation of the rotor in the reversed direction over at least three fourths of a complete revolution.

6. An agricultural machine as claimed in claim 5, wherein one of the bushings is shaped to prevent rotation of the nut of the shear bolt.

7. An agricultural machine as claimed in claim 3, wherein the shear member is a shear bolt received in two bushings welded to the disc and the driving element, respectively.

8. An agricultural machine as claimed in claim 7, wherein the bushing mounted to the disc is adjacent to the abutment, and configured such that when the shaft is rotated in a reverse direction the arm of the lost motion connection engages with the bushing mounted to the disc.

9. An agricultural machine as claimed in claim 2, wherein the radial arm is rotatable in an opposite direction away from the abutment corresponding to rotation of the rotor in the reversed direction over at least half of a complete revolution.

10. An agricultural machine as claimed in claim 2, wherein the radial arm is rotatable in an opposite direction away from the abutment corresponding to rotation of the rotor in the reversed direction over at least three fourths of a complete revolution.

11. An agricultural machine as claimed in claim 10, wherein the shear member is a shear bolt received in two bushings welded to the disc and the driving element, respectively.

12. An agricultural machine as claimed in claim 10, wherein one of the bushings is shaped to prevent rotation of the nut of the shear member.

13. An agricultural machine as claimed in claim 2, wherein the abutment projecting axially from the side of the disc is a bushing mounted to the disc which receives the shear member.

14. An agricultural machine as claimed in claim 1, wherein the driving member of the lost motion coupling includes a collar mounted to the shaft, the collar having an arm, the arm configured for contacting the driven member, wherein the driven member is an abutment projecting axially from a side of the disc.

15. An agricultural machine as claimed in claim 1 further comprising:
   a reveresing mechanism for the rotor of the pickup including a ratchet mounted to the shaft for rotation with both the shaft and the rotor, a reversing arm, a pawl rotatably mounted to the reversing arm, and an actuator configured for moving the pawl between a first position engaged with the ratchet and a second position disengaged with the ratchet; and
   wherein engagement of the pawl with the ratchet rotates the shaft and rotor in the reverse direction.

* * * * *